(12) United States Patent
Franke et al.

(10) Patent No.: US 8,688,953 B2
(45) Date of Patent: Apr. 1, 2014

(54) METHOD AND APPARATUS FOR MANAGING SOFTWARE CONTROLLED CACHE OF TRANSLATING THE PHYSICAL MEMORY ACCESS OF A VIRTUAL MACHINE BETWEEN DIFFERENT LEVELS OF TRANSLATION ENTITIES

(75) Inventors: Hubertus Franke, Cordlandt Manor, NY (US); Benjamin Herrenschmidt, Narrabundah (AU); Jon K. Kriegel, Rochester, MN (US); Andrew M. Theurer, Austin, TX (US); James Xenidis, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/616,515

(22) Filed: Sep. 14, 2012

(65) Prior Publication Data

US 2013/0007408 A1 Jan. 3, 2013

Related U.S. Application Data

(63) Continuation of application No. 12/199,381, filed on Aug. 27, 2008, now Pat. No. 8,275,971.

(51) Int. Cl.
*G06F 12/08* (2006.01)
*G06F 12/10* (2006.01)
(52) U.S. Cl.
USPC ............ 711/207; 711/E12.016; 711/E12.061; 718/1; 719/319

(58) Field of Classification Search
USPC ................ 711/207, E12.061; 718/1; 719/319
See application file for complete search history.

(56) References Cited

U.S. PATENT DOCUMENTS

| | | | |
|---|---|---|---|
| 4,456,954 A | 6/1984 | Bullions, III et al. | |
| 4,816,991 A | 3/1989 | Watanabe et al. | |
| 5,381,535 A | 1/1995 | Gum et al. | |
| 5,555,385 A | 9/1996 | Osisek et al. | |
| 6,895,491 B2 | 5/2005 | Kjios et al. | |
| 6,907,600 B2 | 6/2005 | Neiger et al. | |
| 2008/0155168 A1* | 6/2008 | Sheu et al. | 711/6 |

OTHER PUBLICATIONS

PowerISA_V2.05.
Ex Parte Quayle Action dated Feb. 17, 2012 received from the USPTO in parent case U.S. Appl. No. 12/199,381.
Notice of Allowance dated May 24, 2012 received from the USPTO in parent case U.S. Appl. No. 12/199,381.

* cited by examiner

*Primary Examiner* — Yong Choe
(74) *Attorney, Agent, or Firm* — Scully, Scott, Murphy & Presser, P.C.; Daniel P. Morris, Esq.

(57) ABSTRACT

A method and a system for allowing a guest operating system (guest OS) to modify an entry in a TLB directly without an involvement of a hypervisor are disclosed. Upon receiving a guest TLB miss exception, a guest OS issues a TLBWE (TLB Write Entry) instruction to logic. The logic runs the TLBWE instruction at a supervisor mode without invoking a hypervisor. The TLB may incorporate entries in a guest page table and entries in a host page table.

23 Claims, 9 Drawing Sheets

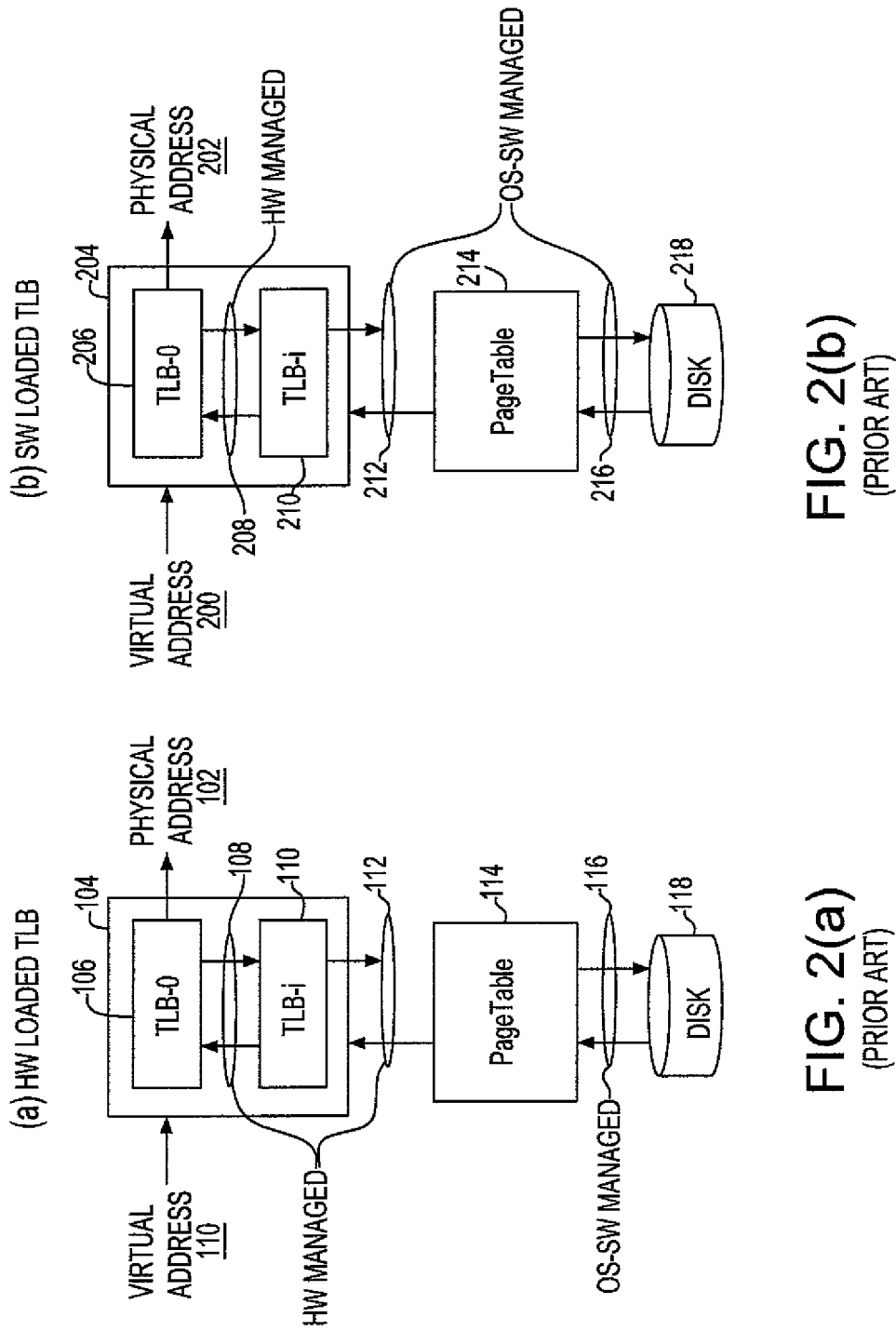

METHOD AND APPARATUS FOR MANAGING SOFTWARE CONTROLLED CACHE OF TRANSLATING THE PHYSICAL MEMORY ACCESS OF A VIRTUAL MACHINE BETWEEN DIFFERENT LEVELS OF TRANSLATION ENTITIES

CROSS REFERENCE TO RELATED APPLICATION

This application is a continuation of U.S. patent application Ser. No. 12/199,381, filed Aug. 27, 2008, the entire content and disclosure of which is incorporated herein by reference.

BACKGROUND OF INVENTION

The present invention generally relates to a virtual machine (i.e., software implementation of a computing device that runs programs like a real computing device). More particularly, the present invention relates to allowing a guest operating system (i.e., an operating system of a virtual machine) to modify an entry of TLB (Translation Lookahead Buffer) (i.e., a cache memory that is used by a memory management hardware to improve a speed of virtual address translation; virtual address translation means a mapping from a virtual address to a physical address) directly without an involvement of a hypervisor (i.e., a virtualization (i.e., separating an operating system from an underlying hardware resources) platform that allows multiple operating systems to run on a host computer at same time).

To enable a secure running of an application, operating systems provide an isolated address space (i.e., a range of discrete addresses solely assigned to an application) to each application. The operating system (OS) actively manages its physical memory (i.e., an actual memory such as DRAM, SRAM and SDRAM) in chunks, commonly referred to as pages. The physical memory is represented as physical addresses (PAs; actual addresses in DRAM, SRAM and SDRAM). A virtual memory refers to a technique which gives an application an impression that the application has contiguous address space, while in fact the address space may be physically fragmented and may even overflow to a disk storage. A virtual memory address may correspond to a physical memory address, as illustrated in FIG. 1(a).

FIG. 1(a) illustrates a virtual address space 10, which is managed by an application, that is divided into three partitions such as text, data and stack. The text partition is usually used for storing program codes. The data partition is usually used for storing data needed for running the program codes. The stack partition is usually for storing temporary data in case of function calls. The physical address space 12 is actual address space that is assigned to the application. FIG. 1(a) illustrates a virtual address is mapped to a physical address (a virtual address corresponds to a physical address). For example, a virtual address 0x00010000 is mapped to a physical memory address (14). A stack pointer that points to a top of the stack is actually mapped to a physical memory (16). In the physical address space (12), an entry such as a physical address (18) is not assigned to any process, while an entry such as a physical address (14) is assigned to a process in the application.

An OS maintains address translations (e.g., mapping a virtual address to a physical address) for an address space of an application. The OS implements these translations per an address space in a hierarchical structure depicted in FIG. 1(b). The structure implementing the translations is called page tables (i.e., a data structure used by a virtual memory in an OS to store mappings between virtual addresses and physical addresses). The page tables can also be implemented by hash tables. Page tables are generally managed by an OS. An application cannot access the page tables and does not know existence of the page tables.

FIG. 1(b) illustrates a virtual address 30 includes a first offset 20, a second offset 21, a third offset 22 and a page offset 23. The first offset 20 is used to index an entry 24 in a first level page table 25. The entry 24 may point to a second level page table 27. Then, the second offset 21 is used to index an entry 26 in the second level page table 27. The entry 26 may point to a third level page table 28. The third offset 22 is used to index an entry 29 in the third level page table 28. At the entry 29, by using the page offset 23, an address translation (i.e., a mapping from a virtual address to a physical address) is retrieved. The retrieved address translation may also include a page index ("page-idx") and protection bits ("prot") (i.e., bits indicating whether the page can be read/modified).

An operation involving a memory access (e.g., reading data from a virtual memory address to a register) first determines an address translation by looking up in the page table. To accelerate this address translation, there is provided a cache called TLB (Translation Lookahead Buffer) including frequently used translations (i.e., mappings from virtual addresses to physical addresses). The TLB is a physical on-chip hardware that can be accessed in a few CPU cycles.

Because TLBs have a limited size, an OS or a CPU must be prepared to handle TLB misses (i.e., there is no entry in a TLB corresponding to a virtual address, so a mapping between the virtual address and a physical address is not found in the TLB). TLB may be a hierarchically structured cache (i.e., including a first level cache, a second level cache, a third level cache) as illustrated in FIG. 2. Lower level caches (e.g., TLB-i (110) in FIG. 2(a) or TLB-i (210) in FIG. 2(b)) is not visible to the OS or the CPU. Therefore, the TLB including multi level caches can be considered as a single cache memory.

There are two fundamental methods to manage a TLB: (a) hardware managed TLB (b) software managed TLB. In the hardware managed TLB, an entry is brought from a page table upon a TLB miss without an involvement of software (e.g., an OS). If an entry including an address translation is not found in a TLB and a page table which resides in a main memory, a page fault (i.e., an interrupt or exception caused by a fact that a page is not found in a main memory) is issued and an OS is invoked to resolve the page fault. The OS may retrieve the faulted page from a disk.

FIG. 2(a) illustrates an example of a hardware managed TLB (i.e., a TLB in which a TLB miss is handled by hardware (e.g., CPU or microcontroller)) A hardware managed TLB 104 may comprise multiple cache memories such as TLB-i (110) and TLB-0 (106). The TLB-i (110) is a lowest level cache in the hardware managed TLB 104. The TLB-0 (106) is a highest level cache in the hardware managed TLB 104. An application provides a virtual address 100 to the hardware managed TLB 104. If an entry corresponding to the virtual address 100 is found in the TLB-0 (106), a physical address 102 in the entry is provided to the application. If the entry is not found in TLB-0 (106), the hardware managed TLB looks up lower level caches (e.g., TLB-i (110)). If the entry is found in a lower level cache, the entry is provided to the TLB-0 (106) via a communication bus (108). Then, the entry is provided to the application.

If the entry is not found any cache in the hardware managed TLB 104, a CPU looks up a page table 114 in a main memory to find the entry. If the entry is found in the page table 114, the entry is provided to the hardware managed TLB 104 via a communication bus 112 and then provided to the application. In the hardware managed TLB 104, searching lower level caches (e.g., TLB-i (110)), searching a page table 114 and delivering the found entry to TLB-0 (106) are controlled by hardware (e.g., CPU or a microcontroller).

If the entry is not found in the hardware managed TLB 104 and the page table 114, the CPU raises a page fault and the OS looks up a disk 118 to find a page corresponding to the virtual address 100. Then, the OS provides the found page to a main memory and the page table 114 is updated to include the entry corresponding to the virtual address 100. Then, the found page is provided to the application. If the OS cannot find a page corresponding to the virtual address 100, the OS sends an error message to the application indicating the application provided a non-existing virtual address. In the hardware managed TLB, searching a disk and delivering the found page is controlled by software (e.g., the OS).

In a software managed TLB (i.e., a TLB in which a TLB miss is handled by software (e.g., an OS) after receiving a TLB miss exception (i.e., an exception indicating a TLB miss occurred) at the software (e.g., the OS)), a TLB miss causes an exception or an interrupt to the OS. The OS searches a page table to find a corresponding entry. Then, the OS updates the TLB with the found corresponding entry. If the corresponding entry cannot be found in the page table, the OS raises a page fault and handles the page fault (e.g., by searching a corresponding page in a disk).

FIG. 2(b) illustrates an example of a software managed TLB. In this example, an application issues an operation (e.g., reading a memory) including a virtual address 200. The virtual address 200 is provided to the software managed TLB 204. If an entry corresponding to the virtual address 200 is found in a highest level cache (e.g., TLB-0 (206)), a corresponding physical address 202 in the entry is provided to the application.

If the entry is not found in highest level cache, an OS (an OS managing the application) looks up lower level caches (e.g., TLB-i (210)) to find the entry. If the entry is found in a lower level cache, the entry is provided to the highest level cache (e.g., TLB-0 206) via a communication bus 208. In the software managed TLB 204, exchanging data (e.g., the virtual address 204 and/or the entry) between caches in the software managed TLB 204 is managed by a hardware unit (e.g., a CPU or microcontroller).

If the entry is not found in the software managed TLB 204, the OS (the OS managing the application) looks up a page table 214 to find the entry in the page table 214. If the entry is found in the page table 214, the found entry is provided to the software managed TLB 204 and to the application. If the entry is not found in the page table 214, the OS raises a page fault and looks up a disk 216 to find a page corresponding to the virtual address 200. If the OS finds the page in the disk 218, the OS delivers the page to a main memory and updates the page table 214 to include the entry corresponding to the page. Then, the OS delivers the page to the application. In the software managed TLB 204, exchanging data (e.g., sending a found entry from the page table 214 to the software managed TLB 204) between the software managed TLB 204 and the page table 214 is controlled by software (e.g., the OS). Exchanging data (e.g., sending the virtual address 200 from the page table 214 to the disk 218) between the main memory where the page table 214 resides and the disk 218 is controlled by software (e.g., the OS).

Virtualized environments mean that one or more operating systems (guest OSs) are virtualized (i.e., virtually run) on top of hardware resource, requiring two levels of address translations. A software entity controlling the hardware resource and presenting an impression of a virtual machine to each of the guest operating systems is commonly referred to as a virtual machine monitor (VMM) or hypervisor (HV). To provide complete isolated address space between virtual machines, the guest operation systems managing the virtual machines cannot directly access a host page table (i.e., a page table managed by a hypervisor) or a TLB to read an address translation or to create an entry for a new address translation. To compromise this obstacle (e.g., no direct access to a host page table or a TLB), two level of translations are typically performed by first translating a guest virtual address (GVA; a virtual address used in a guest operating system; virtual address refers to an address used by an application to read or modify contents of virtual memory) to a guest physical address (GPA; a physical address used in the guest operating system) and then translating a host virtual address (HVA; a virtual address used in a hypervisor) to a host physical address (HPA; a physical address used in the hypervisor), where the GPA is equal to HVA as illustrated FIG. 3.

FIG. 3 illustrates an example of an address translation in a virtualized environment. In one example embodiment of a virtualized environment, depicted in FIG. 3, there are four address spaces per an application: a guest virtual address space 300 (i.e., an address space including guest virtual addresses), a guest physical address space 302 (i.e., an address space including guest physical addresses), a host virtual address space 304 (i.e., an address space including host virtual addresses) and a host physical address space 306 (i.e., an address space including host physical addresses). As shown in FIG. 3, a GVA 0x00010000 is mapped to (corresponds to) a GPA 310. A GPA 312 is mapped to (corresponds to) a HPA 318. A GPA 314 is mapped to (corresponds to) a HPA 316. A HVA 324 is mapped to (corresponds to) a HPA 320. A HVA 326 is mapped to (corresponds to) a HPA 322.

There may be a guest page table (i.e., a page table managed by a guest OS) storing mapping between GVAs and GPAs. There may a host page table (i.e., a page table managed by a hypervisor) storing mapping between HVAs and HPAs.

Neiger et al. (U.S. Pat. No. 6,907,600; hereinafter "Neiger") discusses "creating a guest translation data structure to be used by a guest operating system for address translation operations, creating an active translation data structure based on the guest translation data structure, and periodically modifying the content of the active translation data structure to conform to the content of the guest translations data structure". Neiger further discusses "the content of the active translation data structure is used by a processor to cache address translation in a translation-lookaside buffer (TLB)".

However, Neiger and any existing prior art do not discuss allowing a guest operating system (guest OS; an operating system that is installed in a virtual machine in addition to a host or main operating system) to modify an entry in a TLB directly without an involvement of a hypervisor (i.e., a platform allows multiple operating systems to run on a computer at same time).

Thus, it would be desirable to provide a method and system for allowing a guest OS to modify an entry in a TLB directly without an involvement of a hypervisor.

SUMMARY

The present invention is a system and method for allowing a guest OS to issue a TLBWE (TLB Write Entry) instruction (i.e., an instruction to modify an entry in TLB) at a supervisor mode (i.e., a CPU mode in which an operating system usually runs; a mode which enables running of all instructions, gives an access to a different address space and manages hardware, memory and peripherals) without invoking a privileged instruction trap (a privileged instruction is an instruction that did not have a permission to modify an entry of a memory or cache (e.g., TLB); an exception that is issued for lack of permission to modify an entry in the memory or cache (e.g., TLB) is called the privileged instruction trap) or without invoking a hypervisor.

In one embodiment, there is provided a method for allowing a guest operating system (guest OS) to modify an entry in a main TLB (Translation Lookahead Buffer) directly without an involvement of a hypervisor comprising:

providing a guest virtual address (GVA) from the guest OS to the main TLB;

issuing at the main TLB a guest TLB miss exception, if there is no entry corresponding to the GVA in the main TLB;

in response to the guest TLB miss exception, issuing a TLBWE instruction from the guest OS to a hardware logic, the TLBWE instruction including a <the GVA, a guest physical address (GPA)> tuple, the <the GVA, the GPA> tuple indicating the GVA corresponds to the GPA;

accessing from the hardware logic to a host TLB to find a matching entry in the host TLB, the matching entry including a <the GPA, a host physical address (HPA)> tuple, the <the GPA, the HPA> tuple indicating the GPA corresponds to the HPA;

constructing a new entry for the main TLB based on the found matching entry and the TLBWE instruction, the new entry including a <the GVA, the HPA> tuple, the <the GVA, the HPA> tuple indicating the GVA corresponds to the HPA; and entering the new entry from the hardware logic to the main TLB.

In one embodiment, there is provided a system for allowing a guest operating system (guest OS) to modify an entry in a main TLB (Translation Lookahead Buffer) directly without an involvement of a hypervisor comprising:

means for providing a guest virtual address (GVA) from the guest OS to the main TLB;

means for issuing at the main TLB a guest TLB miss exception, if there is no entry corresponding to the GVA in the main TLB;

means for issuing a TLBWE instruction from the guest OS to a hardware logic, the TLBWE instruction including a <the GVA, a guest physical address (GPA)> tuple, the <the GVA, the GPA> tuple indicating the GVA corresponds to the GPA;

means for accessing from the hardware logic to a host TLB to find a matching entry in the host TLB, the matching entry including a <the GPA, a host physical address (HPA)> tuple, the <the GPA, the HPA> tuple indicating the GPA corresponds to the HPA;

means for constructing a new entry for the main TLB based on the found matching entry and the TLBWE instruction, the new entry including a <the GVA, the HPA> tuple, the <the GVA, the HPA> tuple indicating the GVA corresponds to the HPA; and means for entering the new entry from the hardware logic to the main TLB.

In a further embodiment, the main TLB integrates at least one entry in a guest page table (i.e., a page table managed by a guest OS) and at least on entry in a host page table (i.e., a page table managed by a hypervisor).

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

FIG. 2(a) illustrates a hardware managed TLB.

FIG. 2(b) illustrates a software managed TLB.

DETAILED DESCRIPTION

In one embodiment of the present invention, a guest shadow page table is utilized to support an address translation in a virtualized environment. A guest OS maintains a virtual page table (i.e., a page table which is not actually exists in a main memory) called a guest page table (i.e., a page table including mappings between GVAs and GPAs). The hypervisor maintains a real page table which is an actual realization of the guest page table. The real page table is called as a guest shadow page table.

Figure 1B:
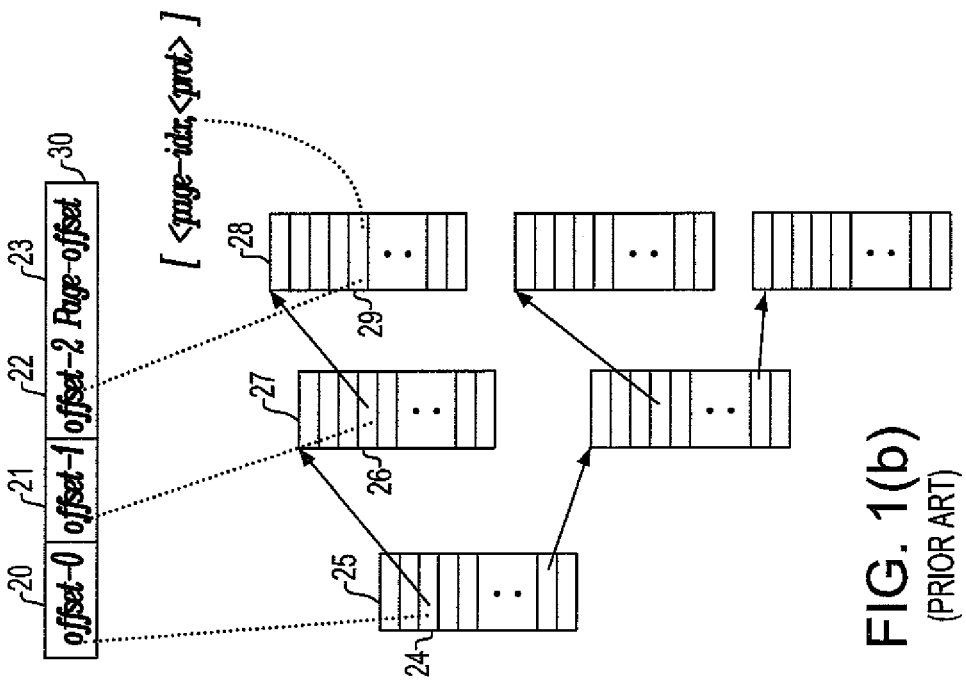
FIG. 1(b) illustrates a page table.
Figure 1A:
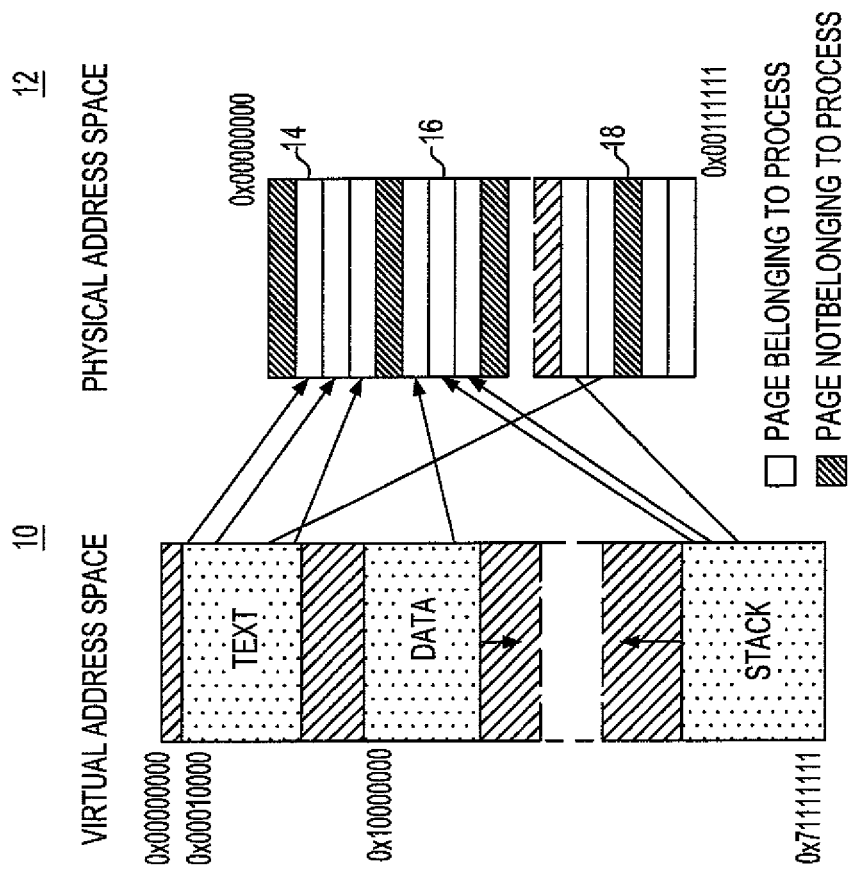
FIG. 1(a) illustrates a virtual address is mapped (corresponds to) a physical address.
Figure 3:
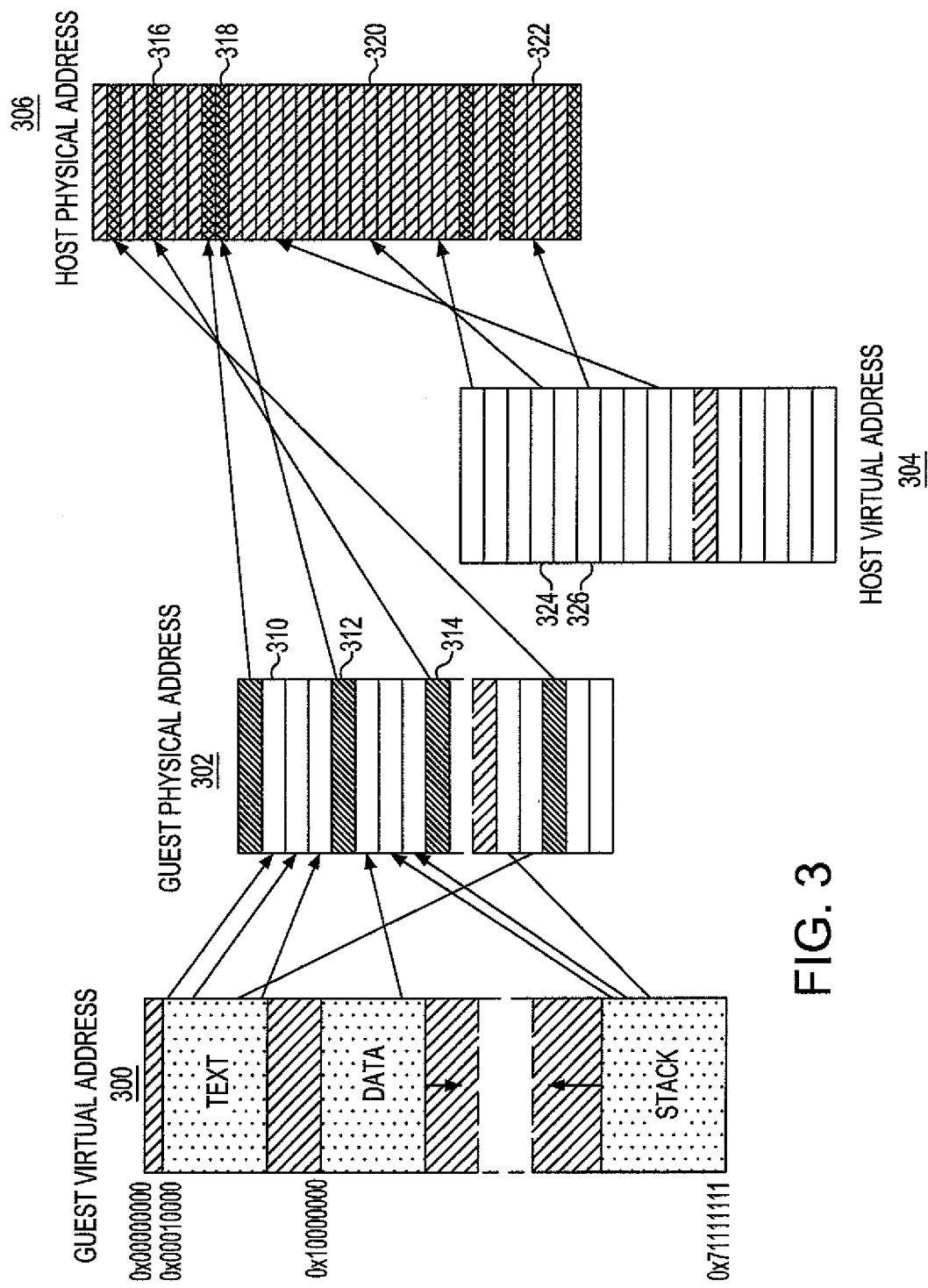
FIG. 3 illustrates a virtual memory management in a virtualized environment (i.e., an environment where multiple virtual machines operates on a host computer).
Figure 4:
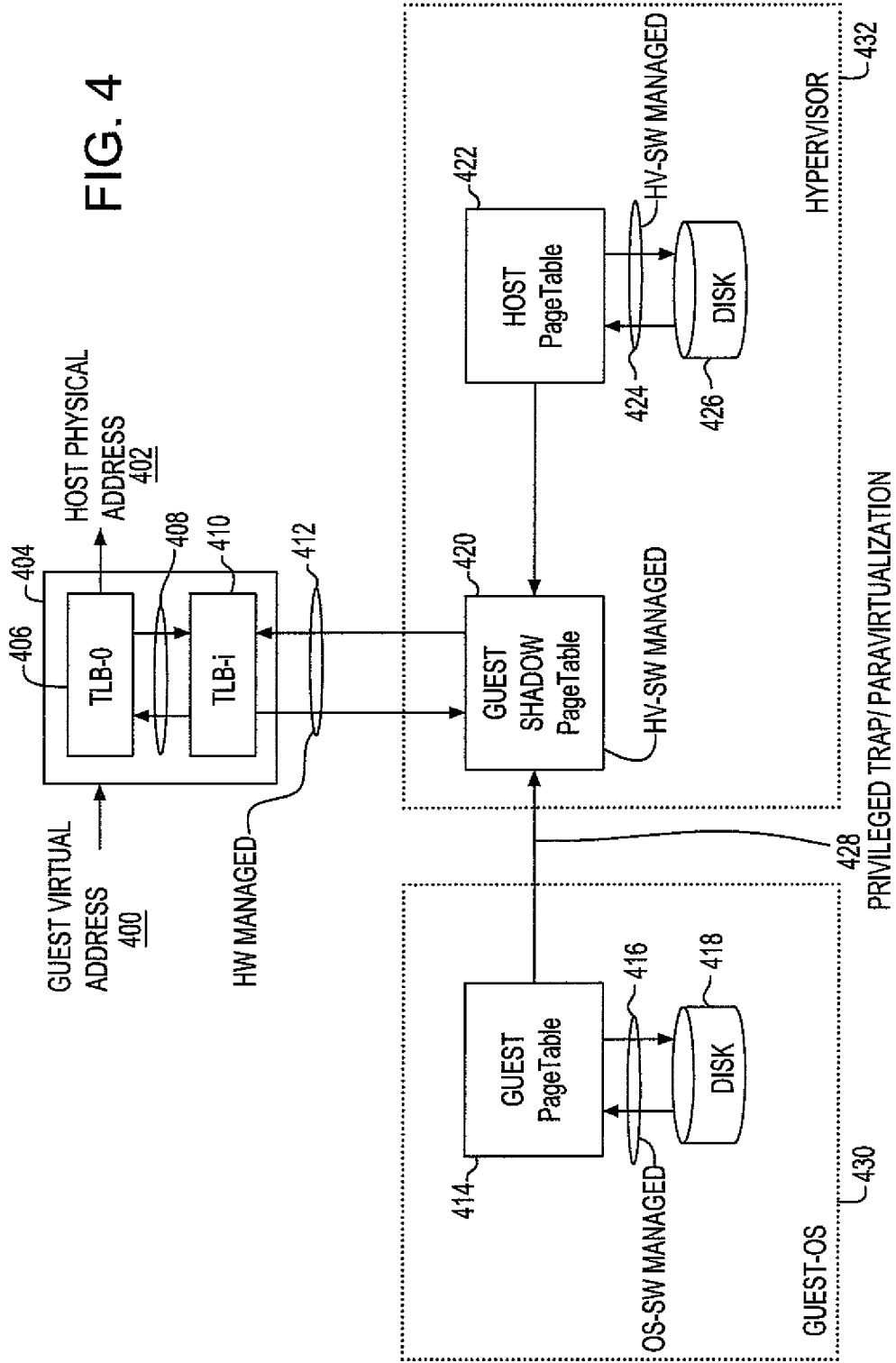
FIG. 4 illustrates an address translation using a shadow page table (i.e., a page table that a guest OS uses as an independent copy of a page table which are unknown to hardware (e.g., CPU or microcontroller).

FIG. 4 illustrates how the guest shadow page table is utilized in the address translation. A guest virtual address 400 is provided to a TLB 404 by an application. Then, the TLB 404 looks up an entry corresponding to the guest virtual address 400. If the entry is found in the TLB 404, a host physical address 402 in the entry is provided to the application. When looking up the entry in the TLB 404, a highest level cache (e.g., TLB-0 406) is first searched. If the entry is not found at the highest level cache (e.g., TLB-0 406), lower level caches (e.g., TLB-i 410) is searched. The highest level cache and the lower level caches exchanges data (e.g., the virtual address 400, the entry) via a communication bus 408.

If the entry is not found in the TLB 404, a hypervisor 432 is invoked to look up the guest shadow page table 420 to find an entry corresponding to the GVA 400. If the entry is found in the guest shadow page table 420, the found entry is provided to the TLB 400 and also provided to the application by hardware (e.g., CPU or microcontroller) via a communication bus 412. If the entry is not found in the guest shadow page table 420, a page fault is issued by the hypervisor 432. Then, a guest OS 430 associated with the application looks up a guest page table 414 to find the entry. If the guest OS finds the entry in the guest page table 414, the guest OS attempts to write the found entry in the guest shadow table 420. However, the guest OS is not privileged (i.e., not allowed) to directly update the guest shadow page table 420, which is managed by the hypervisor 432. Thus, a guest OS issues a privileged trap (i.e., an instruction that does not give a permission to modify the guest shadow page table 420; issuing the privileged trap causes an exception and the exception invokes the hypervisor 432) or a paravirtualization 428 (i.e., calling a hypervisor 432 by exactly specifying what the hypervisor 432 needs to do with specified arguments). The privileged trap or paravirtualization 428 invokes an exception handler. The exception handler takes a guest address translation (i.e., mapping from the GVA 400 to a GPA) from the guest page table 414 and then takes a host address translation (i.e., mapping from the GPA to a HPA) from the host page table 422. Then, the exception handler combines the two address translations to form a mapping from the GVA 400 to the HPA 402 and then loads the mapping from the GVA 400 to the HPA 402 to the guest shadow page table 420 and to the TLB 404. The loading the mapping to guest shadow page table 420 and to the TLB 404 may be controlled by hardware (e.g., CPU or microcontroller).

If the guest OS 430 cannot find the entry in the guest page table 414, the guest OS 430 issues a page fault. Then, the guest OS searches a disk 418 to find a page corresponding to the GVA 400. If the page is found in the disk, the guest OS 430 provides the page to the application, updates the guest page table 414 and issues the privileged trap or paravirtualization 428 to update the guest shadow page table 420 and/or the TLB 404. The guest OS 430 may manages data exchange (e.g., sending the GVA 400 from the guest page table 414 to the disk 418) between the guest page table 414 and the disk 418. The data exchange may be done via a communication bus 416. If the page is not found in the disk 418, the guest OS may issue an error message indicating the application provided an illegal GVA.

If the exception handler cannot find the host address translation (i.e., the mapping from the GPA to the HPA) in the host page table 422, the exception handler invokes a page fault. Then, the hypervisor 432 accesses the disk 426 to find a page that corresponds to the GPA. After the hypervisor 432 finds the page in a disk 426, the hypervisor provides the page to the application, updates the host page table 422 with an entry with the mapping from the GPA to the HPA 402 and updates the guest shadow page table 420 with the mapping from the GVA 400 to the HPA 402 by combining the mapping from the GVA 400 to the GPA and the mapping from the mapping from the GPA to the HPA 402. Data exchange (e.g., sending the GPA from the host page table 422 to the disk 426) between the host page table 422 and the disk 426 may be managed by the hypervisor 432 via a communication bus 424.

Figure 5:
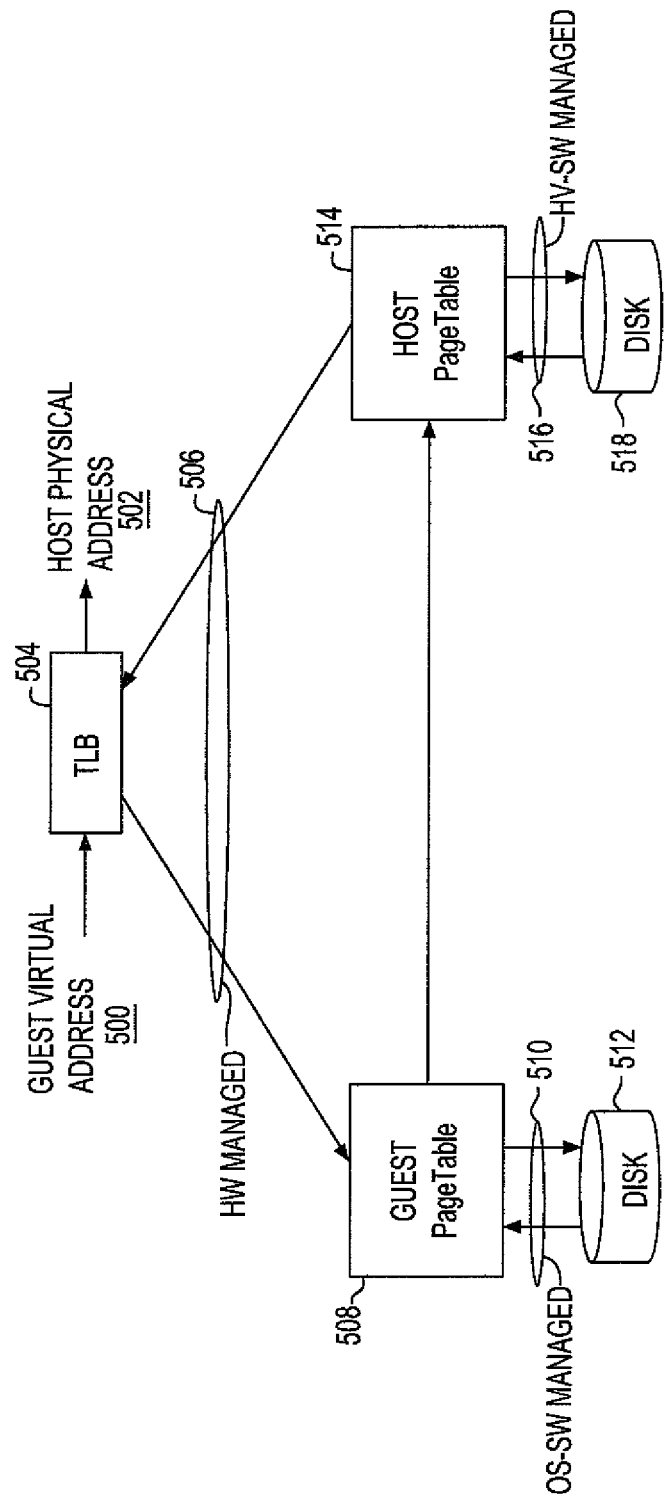
FIG. 5 illustrates accessing a guest page table and a host page table to form an entry having a mapping from a GVA to a HPA.

One embodiment of the present invention enables both an access to a guest page table (i.e., a page table managed by a guest OS) and an access to a host page table (i.e., a page table managed by a hypervisor) to determine an address translation (e.g., a mapping from a GVA to a HPA). FIG. 5 illustrates how an address translation is done in this embodiment. An application provides a GVA 500 to a TLB 504. If an entry corresponding to the GVA 500 is found in the TLB 504, a HPA 502 in the entry is provided to the application.

If a TLB miss occurs (i.e., there in no entry corresponding to the GVA 500 in the TLB 504), a hardware logic (not shown) accesses a first register (not shown) holding page table entries of the application or access a guest page table 508 associated with the application to find the entry in the first register or in the guest page table 508. The entry may include the mapping from the GVA to a GPA. Then, the hardware logic access a second register (not shown) holding page table entries associated with a guest OS running on a hypervisor or a host page table 514 associated with the hypervisor to find out an entry associated with the GPA. The guest OS may manages the application. The entry may include a mapping from the GPA to a HPA 502. Then, the hardware logic combines the two mappings to form a mapping from the GVA 500 to the HPA 502 and then loads the mapping from the GVA 500 to HPA 502 into the TLB 504.

When the hardware logic cannot find the entry associated with the GVA 500 in the first register or the guest page table 508, the guest OS associated with the application accesses a disk 512 to retrieve a page associated with the GVA 500. When the hardware logic cannot find the entry associated with GPA in the second register or the host page table 514, the hypervisor accesses a disk 518 to retrieve a page associated with the GPA.

A TLB in this embodiment is considered a privileged resource (i.e., a resource that can be accessed only by another resource which has permission to access) to ensure that various guest OSs maintains each isolated address space. Therefore, the TLB is not directly managed by guest OSs. Hence, an operation to modify an entry in the TLB is handled by the hypervisor and the operation to modify is be trapped into the hypervisor (i.e., an exception is caused to invoke the hypervisor).

In this embodiment, a page fault can result in two exceptions, a first exception to be handled by a guest OS to create an entry of a mapping from a GVA to a GPA and a second exception handled by the hypervisor to issue a TLBWE instruction (i.e., an instruction for writing an entry in TLB) that installs an entry of mapping from the GVA to a HPA into the TLB. A TLBWE instruction is also described in Power ISA™ Version 2.05 published by IBM® on Oct. 23, 2007. Therefore, chapters 4.7 and 4.9.4 in a section Book III-E in the Power ISA™ Version 2.05 is incorporated as a reference herein.

Figure 6:
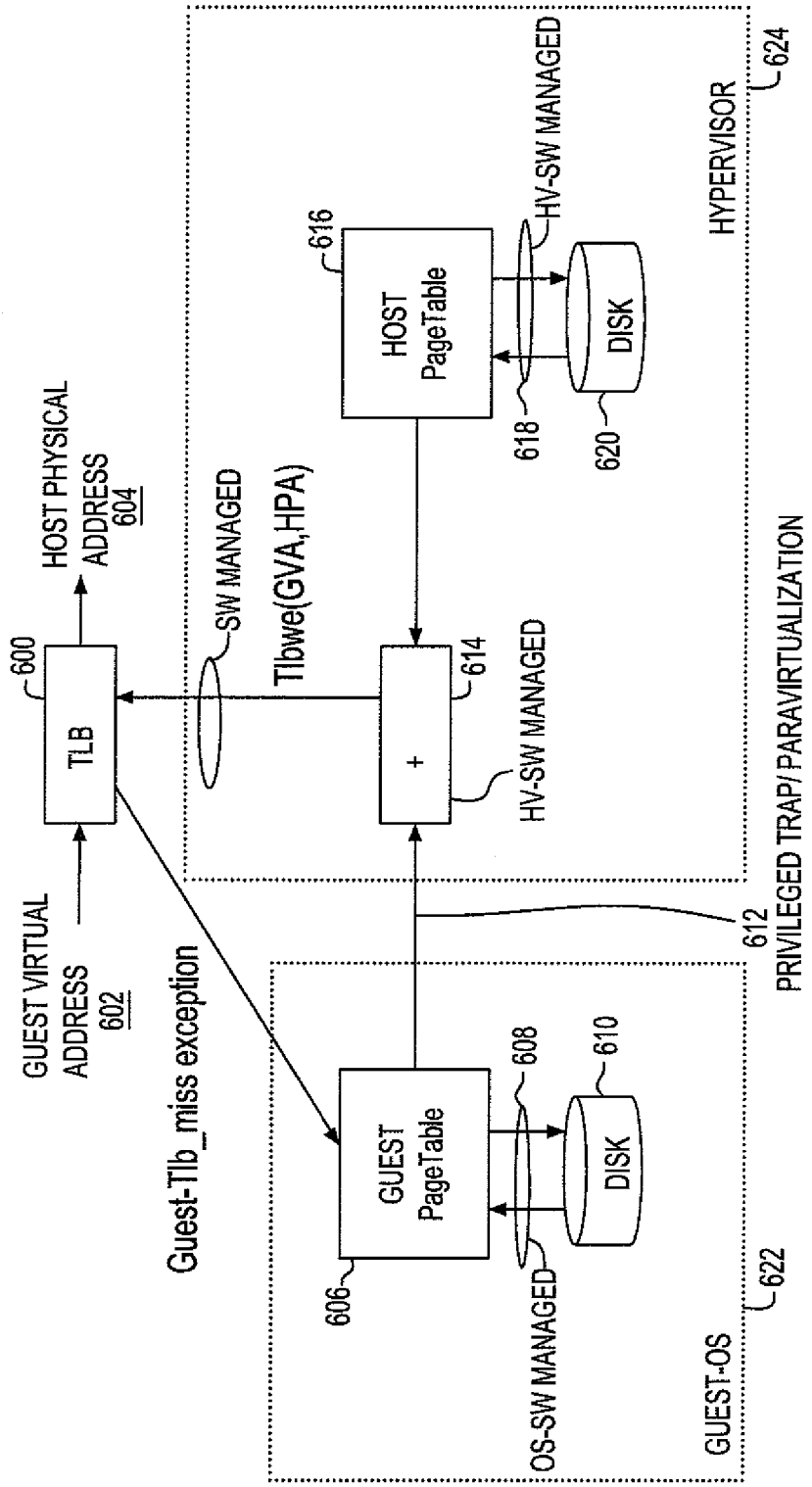
FIG. 6 illustrates an address translation using a hypervisor in a virtualized environment.

FIG. 6 illustrates an example that shows a TLBWE instruction is issued and managed by a hypervisor 624. An application provides a GVA 602 to a TLB 600. The TLB 600 looks up an entry matching with the GVA 602. If there is an entry matching with the GVA 602 in the TLB 600, a HPA 604 in the entry is provided to the application. If the entry is not found in the TLB 600, a guest TLB miss exception (i.e., an exception indicating that there is no entry matching with the GVA 602 in the TLB 600) is issued by the TLB 600. Then, a guest OS 622 managing the application looks up a guest page table 606 to find the entry matching with the GVA 602. If the guest OS 622 finds the entry in the guest page table 606, the guest OS 622 issues a privileged trap or a paravirtualization to a logic 614 that is handled by a hypervisor 624. The entry in the guest page table 606 may include a mapping from the GVA 602 to a GPA. Then, the hypervisor 624 looks up the host page table 616 to find an entry matching with the GPA. If there is a matching entry in the host page table 616, the hypervisor 616 provides the matching entry to the logic 614. The matching entry in the host page table 616 may include a mapping from the GPA to the HPA 604. Then, the logic combines an entry found in the guest page table 606 and an entry found in the host page table 616 to form a mapping from the GVA 602 to the HPA 604. Then, the logic issues a TLBWE instruction to write an entry in TLB 600 which includes the mapping from the GVA 602 to the HPA 604. Issuing the TLBWE instruction may be managed by the hypervisor 624. If the guest OS 622 cannot find an entry matching with the GVA 602 in the guest page table 606, the guest OS 622 retrieves a page corresponding to the GVA 602 from the disk 610 via a communication bus 608. If the hypervisor 624 cannot find an entry matching with the GPA in the host page table 616, the hypervisor 624 retrieves a page corresponding to the GPA from the disk 620 via a communication bus 618. The logic 614 may be implemented as hardware by FPGA (Field Programmable Gate Array), CPLD (Complex Programmable Logic Device) or ASIC (Application Specific Integrated Circuit) by using a hardware description language (Verilog, VHDL, SystemC, etc.) The logic 720 may be implemented by a CPU or microcontroller executing microcode, assembly code or machine code.

Figure 7:
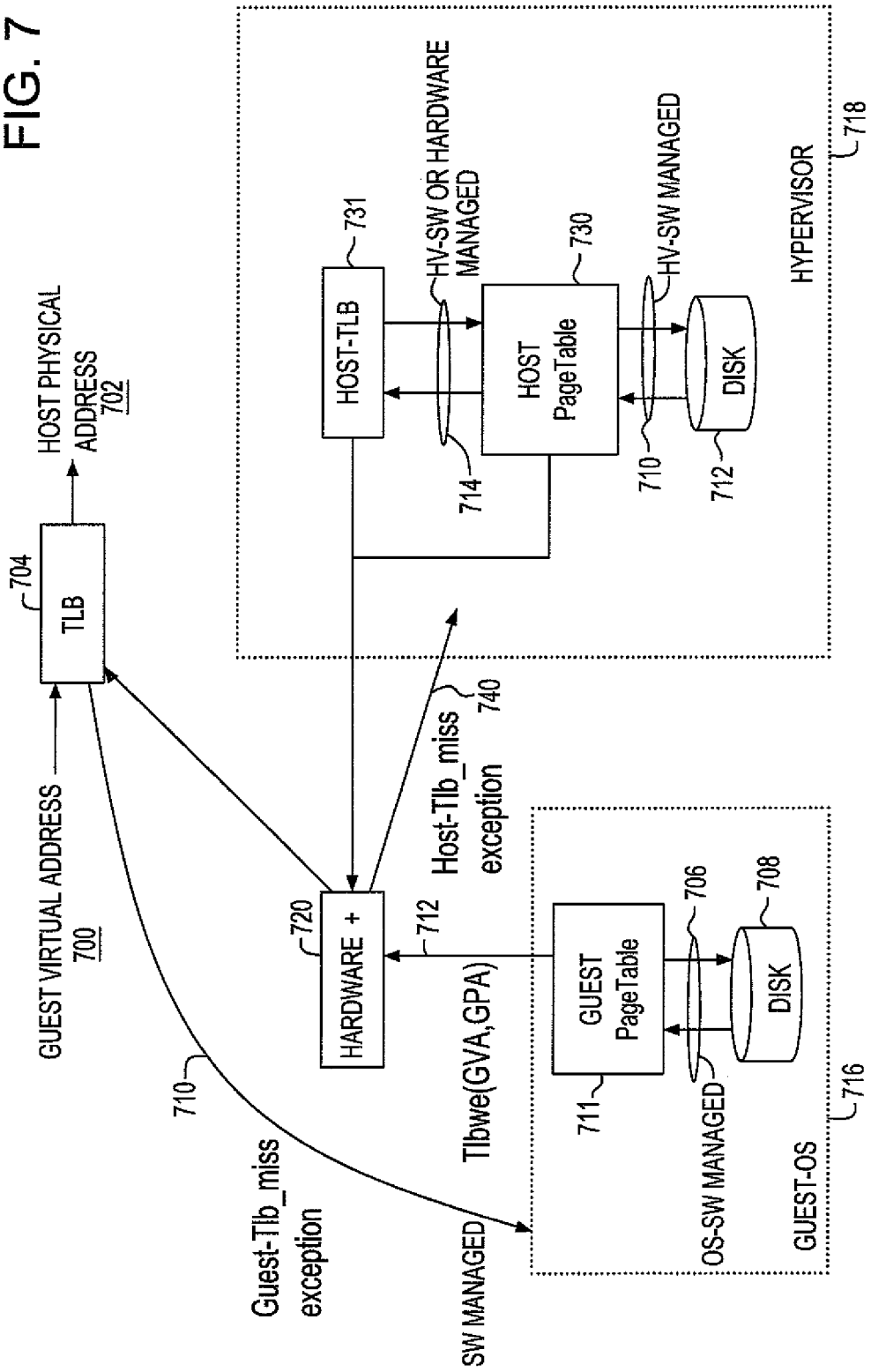
FIG. 7 illustrates an address translation by using a TLBWE instruction issued from a guest OS without an intervention of a hypervisor.

FIG. 7 illustrates a guest OS issuing a TLBWE instruction without an involvement of a hypervisor. An application provides a GVA 700 to a main TLB 704. If an entry matching with the GVA 700 is found in the main TLB 704, a HPA 702 in the entry is provided to the application. Otherwise, the main TLB 704 issues a guest TLB miss exception 710. In response to the guest TLB miss exception 710, a guest OS 716 managing the application looks up a guest page table 711 to find the entry. If the guest OS 716 finds the entry in the guest page table 711, the guest OS issues a TLBWE instruction 712 to a logic 720. The entry in the guest page table may include a mapping from the GVA 700 to a GPA. The logic 720 may be implemented as hardware by FPGA (Field Programmable Gate Array), CPLD (Complex Programmable Logic Device) or ASIC (Application Specific Integrated Circuit) by using a hardware description language (Verilog, VHDL, SystemC, etc.) The logic 720 may be implemented by a CPU or microcontroller executing microcode, assembly code or machine code. The TLBWE instruction 712 includes a <the GVA, the GPA> tuple (i.e., a tuple is a data object containing two or more components such as a pair, triple, quad) indicating that the GVA corresponds to the GPA or the GVA is mapped to the GPA. The TLBWE instruction 712 may further include guest protection bits indicating whether the application can read/write/modify contents of memory referred by the GVA.

After receiving the TLBWE instruction 712, the logic 720 is implemented to access a host TLB 731 (i.e., a TLB managed by a hypervisor 718) to find an entry matching with the GPA. The entry in the host TLB 731 may include a <the GPA, a HPA> tuple. The <The GPA, the HPA> tuple indicates that the GPA corresponds to the HPA or that the GPA is mapped to the HPA. The entry in the host TLB 731 may further include host protection bits indicating whether the application can read/write/modify contents of memory referred by the GPA.

If the host TLB 731 does not have an entry matching with the GPA, the logic 730 looks up a host page table 730 to find the entry matching with the GPA. The entry in the host page table 730 may include a <the GPA, a HPA> tuple. The <The GPA, the HPA> tuple indicates that the GPA corresponds to the HPA 702 or that the GPA is mapped to the HPA 702. The entry in the host page table 730 may further include host protection bits indicating whether the application can read/write/modify contents of memory referred by the GPA. If the entry is found in the host page table 730, the host page table 730 provides the entry to the host TLB 731 to create the found entry in the host TLB 731. Data exchange (e.g., sending the entry from the host page table 730 to the host TLB 731) may be managed by a hypervisor 718 or managed by the logic 720 via a communication bus 714.

Upon finding the matching entry in the host TLB 731 or the host page table 730, the logic 720 combines the mapping provided by the TLBWE instruction and the mapping found in the host TLB 731 or the host page table 730 to construct a new entry in the main TLB 704. The new entry may include a <the GVA, the HPA> tuple indicating that the GVA 700 is mapped to the HPA 702 or that the GVA 700 corresponds to the HPA 702. Then, the logic 720 writes the new entry in the main TLB 704. In this embodiment, the TLBWE instruction is issued by the guest OS 716 under a supervisor mode without invoking a hypervisor 718 or without causing a privileged trap. The logic 720 may be able operate under a supervisor mode (i.e., a mode being operated or managed by an OS) or a hypervisor mode (i.e., a mode being operated or managed by a hypervisor). In this embodiment, the logic 712 is preferred to be operated in a supervisor mode.

In a further embodiment, if the logic 712 cannot find an entry matching with the GPA in the host TLB 731, the logic 712 raises a host TLB miss exception 740. The host TLB miss exception 740 indicates that there is no entry matching with the GPA in the host TLB 731. In response to the host TLB miss exception 740, a hypervisor is invoked to handle the host TLB miss exception 740. Then, the hypervisor 718 looks up the host page table 730 to find the entry matching with the GPA. If the hypervisor 718 finds the matching entry in the host page table 730, the hypervisor 718 installs the matching entry in the host TLB 731. The matching entry may include the <the GPA, the HPA> tuple. Upon installing the matching entry in the host TLB 731, the hypervisor enables the guest OS to reissue the TLBWE instruction.

After receiving the guest TLB miss exception 710, if the guest OS 716 cannot find an entry matching with the GVA 700 in the guest page table 711, then the guest OS 716 issues a page fault and then retrieves a page corresponding to the GVA 711 from a disk 708. Then, the guest OS 716 writes a new entry matching with the GVA in the guest page table 716. At the same time, the guest OS issues the TLBWE instruction 712 to write a new entry matching with the GVA in the main TLB 704. The retrieved page may be provided to the application by the guest OS 716. Data exchange (e.g., sending the GVA from the guest page table 711 to the disk 708) between the disk 708 and the guest page table 711 may be managed by software (e.g., the guest OS 716) via a communication bus 706.

After receiving the host TLB miss exception 740, if the hypervisor 718 cannot find an entry matching with the GPA in the host page table 730, the hypervisor 718 issues a page fault and retrieves a page matching the GPA from a disk 712. Then, the hypervisor writes an entry matching with the GPA in the host page table 730. At the same time, the hypervisor writes an entry matching with the GPA in the host TLB 731. Data exchange between the host page table 730 and the disk 712 may be managed by software (e.g., the hypervisor 718) via a communication bus 710.

In a further embodiment, the guest OS 716 and the hypervisor 718 share a same disk. In other words, the disk 708 and the disk 712 is a same storage device (e.g., a magnetic disk, an optical disk or a hard disk).

In a further embodiment, the host TLB 731 is managed (read and written) by hardware (e.g., the logic 720) without an involvement of the hypervisor. In this embodiment, when a new entry needs to be written in the host TLB 731, the hypervisor provides the new entry to the hardware and then the hardware issues a TLBWE instruction to the host TLB 731 without invoking the hypervisor. The TLBWE instruction may include a <a GPA, a HPA> tuple indicating that the GPA corresponds to the HPA or the GPA is mapped to the HPA.

In a further embodiment, the logic 720 rewrites the TLBWE instruction 712, which is issued from the guest OS 716, to fill an entry in the main TLB 704 with a mapping from the GVA 700 and the HPA 702. The mapping is constructed based on the TLBWE instruction 712 and the matching entry found in the host TLB 731 or in the host page table 730.

In a further embodiment, the main TLB 704 stores a global virtual address (i.e., a virtual address that can be identified or used by any application) and a global physical address (i.e., a physical memory address that is recognized by a processor). In this embodiment, a GVA and a HVA are local virtual addresses (i.e., an address that can only be recognized by a guest OS or a hypervisor). A GPA and HPA are physical local addresses (i.e., addresses that can only be recognized by a guest OS or a hypervisor). In this embodiment, the hypervisor 718 generates a global virtual address (VA) by executing VA=H(HVA), where H is an identity function (i.e., H(x)=x). Therefore, VA is equal to HVA. The hypervisor 718 generates a global physical address (PA) by executing PA=H(HPA), where H is an identity function (i.e., H(x)=s). Therefore, PA is equal to HPA. The guest OS 716 generates a global virtual address (PA) by executing VA=GV(GVA), where GV(x) is concatenating LPID, GS and x. The LPID is a unique identification number of a guest OS. For example, each guest OS has a unique LPID comprising 8-bit, 16-bit or 32-bit. The GS is a one-bit number representing whether the logic 720 (e.g., CPU, microcontroller, etc.) operates in a hypervisor mode or a supervisor mode. For example, if a GVA is 1010_1010_1010_1010_1010_1010_1010_1010$_2$, a GS is $1_2$, and a LPID is 0011_0011$_2$, then a VA is 0_0110_0111_1010_1010_1010_1010_1010_1010_1010_1010$_2$. The guest OS 716 generates a global physical address (GPA) by executing PA=GP (GPA), where GP( ) function may be implemented as a lookup table (e.g., host TLB 731 or host page table 730) or a computation (e.g., PA=(a partition size of the guest OS 716×(the LPID-1))+GPA, where the LPID is larger than or equal to 1 and the partition size refers to a physical memory space assigned to the guest OS 716). In this embodiment, after the guest OS 716 issues the TLBWE (GVA, GPA) instruction 712, the logic 720 issues TLBWE (the VA generated by the guest OS 716, the PA generated by the guest OS 716) instruction to install an entry in the main TLB 704 including a <the VA generated by the guest OS 716, the PA generated by the guest OS 716> tuple, where the PA generated by guest OS 716 may be equal to the HPA.

In a further embodiment, the logic 720 constructs the TLBWE instruction 712 after the logic 720 looks up the guest page table 711 to find an entry matching with the GVA 700. In this embodiment, the logic 720 looks up the guest page table 711 without an involvement of the guest OS 716. The logic 720 also looks up the host TLB 731 and/or the host page table 730 to find an entry including a mapping from a GPA to a HPA. In this embodiment, the logic 720 looks up the host TLB 731 and/or the host page table 730 without an involvement of the hypervisor 718. In other words, in this embodiment, the TLBWE instruction 712 is utilized to fill entries in the main TLB 704 without any intervention of software (e.g., the guest OS 716 or the hypervisor 718).

In a further embodiment, a mapping from a GVA to a GPA is referred to a guest address translation, because the guest OS 716 may find the mapping from the guest page table 711. The guest OS 716 may issue the TLBWE instruction 712 to deliver the guest address translation to the logic 720. A mapping from a GPA to a HPA is referred to a hypervisor address translation or host address translation, because the hypervisor 718 may find the mapping from the host TLB 731 or the host page table 730. The hypervisor may also issue a TLBWE instruction to deliver the hypervisor address translation to the logic 720.

Figure 8:
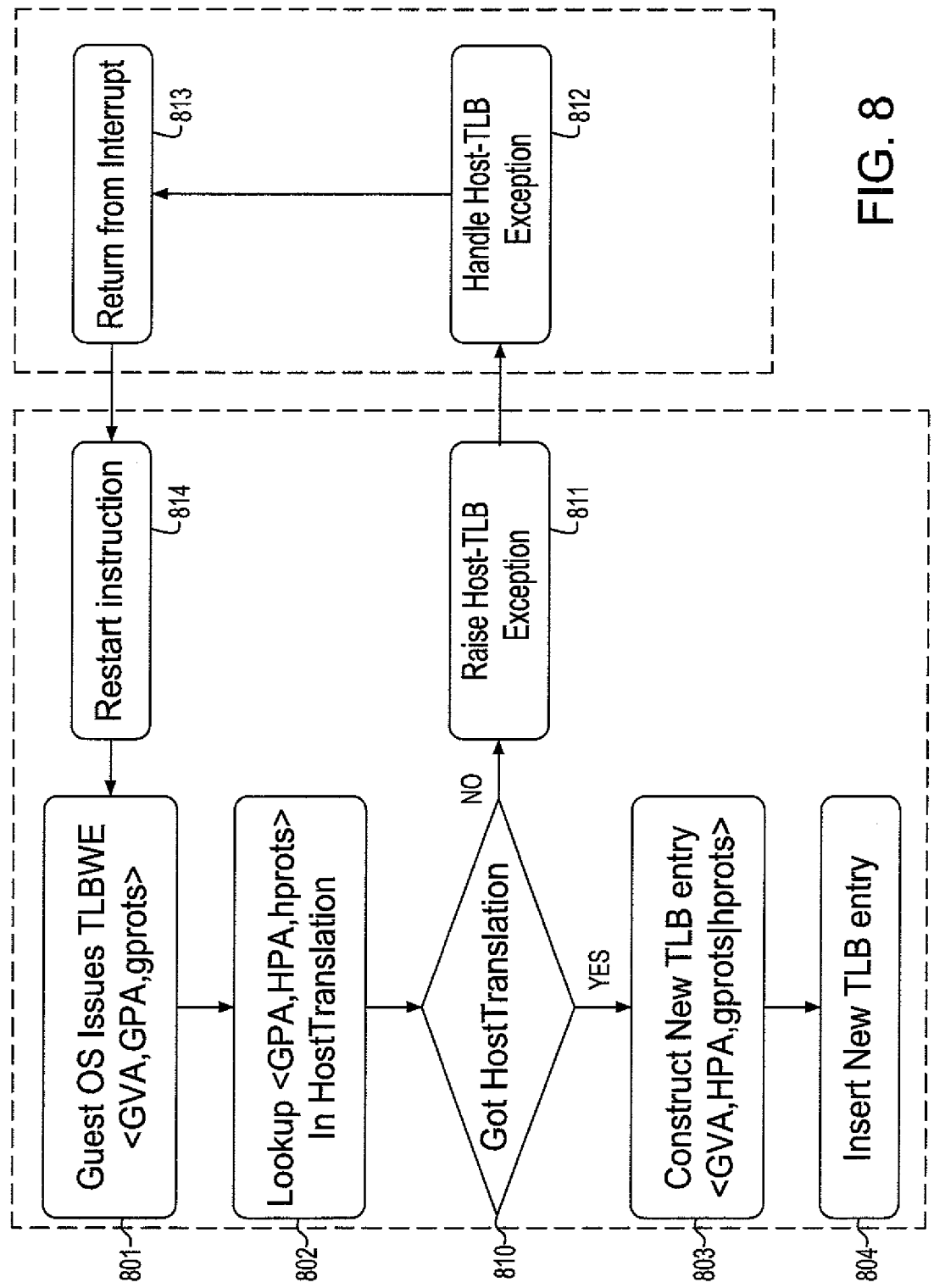
FIG. 8 illustrates a flow chart describing a method that one embodiment of the present invention employs.

FIG. 8 illustrates a flow chart that one embodiment of the present invention employs. At step 801, a guest OS 716 issues a TLBWE instruction 712, in response of a guest TLB miss exception 710. The TLBWE instruction may include a <a GVA 700, a GPA> tuple, which indicates a mapping from the GVA 700 to the GPA. This mapping may be found in the guest page table 711. TLBWE instruction 712 may further include guest protection bits ("gprots").

At step 802, the logic 720 looks up a host address translation in the host TLB 731. The host address translation may include a mapping from the GPA to a HPA 702. The host address translation may further include host protection bits. At step 810, it is evaluated whether the logic 720 found the host address translation in the host TLB 731.

If the logic 720 found the host address translation in the host TLB 731, at step 803, a mapping from the GVA 700 to the HPA 702 is constructed based on the TLBWE instruction 712 and the host address translation. At step 804, the mapping from the GVA 700 to the HPA 702 is inserted as a new entry to the main TLB 704. The new entry in the main TLB 704 may additionally include the guest protection bits and/or the host protection bits. In a further embodiment, the new entry in the main TLB 704 may further include a partition ID (LPID) to uniquely identify a guest OS. The GVA 700 may include the LPID in it. The LPID allows multiple entries with same GVA in the main TLB 704. Each of the multiple entries is distinguished by each different LPID and belongs to a different guest OS having each different LPID. In this embodiment, a combination of a GVA and a LPID corresponds to a HPA. In other words, the combination of the GVA and the LPID is mapped to the HPA. This embodiment also prevents the hypervisor 718 from invaliding all entries in the main TLB 704 when switching a currently run guest OS from a first guest OS to a second guest OS. If the main TLB 704 includes one or more entries belonged to the second guest OS before the switching, the one or more entries remains valid after the switching.

In a further embodiment, to prevent a collision (i.e. having a same VA) between different processes in different OSs, a VA is determined by {(the GVA 700∥a process identification (PID)∥the LPID)×the PID+the LPID}, where ∥ refers to a concatenation of bits and the PID refers to a unique identification of a process in a guest OS 716. In a preferred embodiment, the VA is determined by {(a most significant bit (MSB) of the GVA∥16 bits from the PID∥8 bits from the LPID)×the PID+the LPID}. There may be a register to store the LPID. There may be another register to store the PID. For example, the GVA is 1100_1100_1100_1100_1100_1100_1100_1100$_2$. The PID is 0101_0101_0101_0101_0101_0101_0101_0101$_2$. The LPID is 1001_1001_1001_1001_1001_1001_1001_1001$_2$. Then, the HVA is calculated by {($1_2$∥0101_0101_0101_0101$_2$∥1001_1001$_2$)×0101_0101_0101_0101_0101_0101_0101_0101$_2$+1001_1001_1001_1001_1001_1001_1001_1001$_2$}=1_0101_0101_0101_0101_1001_1001$_2$×0101_0101_0101_0101_0101_0101_0101_0101_0101$_2$+1001_1001_1001_1001_1001_1001_1001_1001$_2$=FF8E_38CD$_{16}$+1001_1001_1001_1001_1001_1001_1001_1001$_2$=9927_D266$_{16}$. (The FF8E_38CD$_{16}$ is obtained from lower 32 bits of an output of multiplication of 1_0101_0101_0101_0101_1001_1001$_2$ and 0101_0101_0101_0101_0101_0101_0101_0101$_2$. The 9927_D266$_{16}$ is obtained from lower 32 bits of an output of addition of FF8E_38CD$_{16}$ and 1001_1001_1001_1001_1001_1001_1001_1001$_2$.)

Returning to FIG. 8, if the logic 720 could not find the host address translation in the host TLB 731, at step 811, the host TLB 731 raises a host TLB miss exception 740. Then, at step 812, a hypervisor 718 is invoked to handle the host TLB miss exception 740. While handling the host TLB miss exception 740, the hypervisor 718 may look up the host page table 730 to find the host address translation. If the host address translation is found in the host page table 730, the hypervisor 718 may install the found host address translation in the host TLB 731. Otherwise, the hypervisor 718 issues a page fault and then looks up the disk 712 to find a page corresponding to the GPA provided by the TLBWE instruction 712. If the page is found the disk 712, the hypervisor 718 retrieves the page to a main memory where the host page table 730 resides. Then, the hypervisor 718 writes a new entry corresponding to the retrieved page (the host address translation) in the host page table 730 and the host TLB 731. If the page is not found in the disk 712, the hypervisor 718 may issue an error indicating the GPA is invalid.

Upon writing an entry including the host address translation in the host TLB 731, at step 813, the hypervisor 718 completes handling the host TLB miss exception, e.g., by executing a "return from interrupt" instruction (i.e., an instruction that place a CPU back to an instruction that caused the interrupt). At step 814, the hypervisor 718 allows the guest OS 716 reissues the TLBWE instruction 712, which previously caused the host TLB miss exception 740. After the TLBWE instruction 712 is reissued at step 801, the logic 720 processes the TLBWE 712 instruction without an involvement of software (e.g., the guest OS 716 or the hypervisor 718) through steps 802, 810, 803 and 804. There may be no host TLB miss exception 740 when re-executing the TLBWE instruction 712, because the host TLB already has the host address translation.

Figure 9:
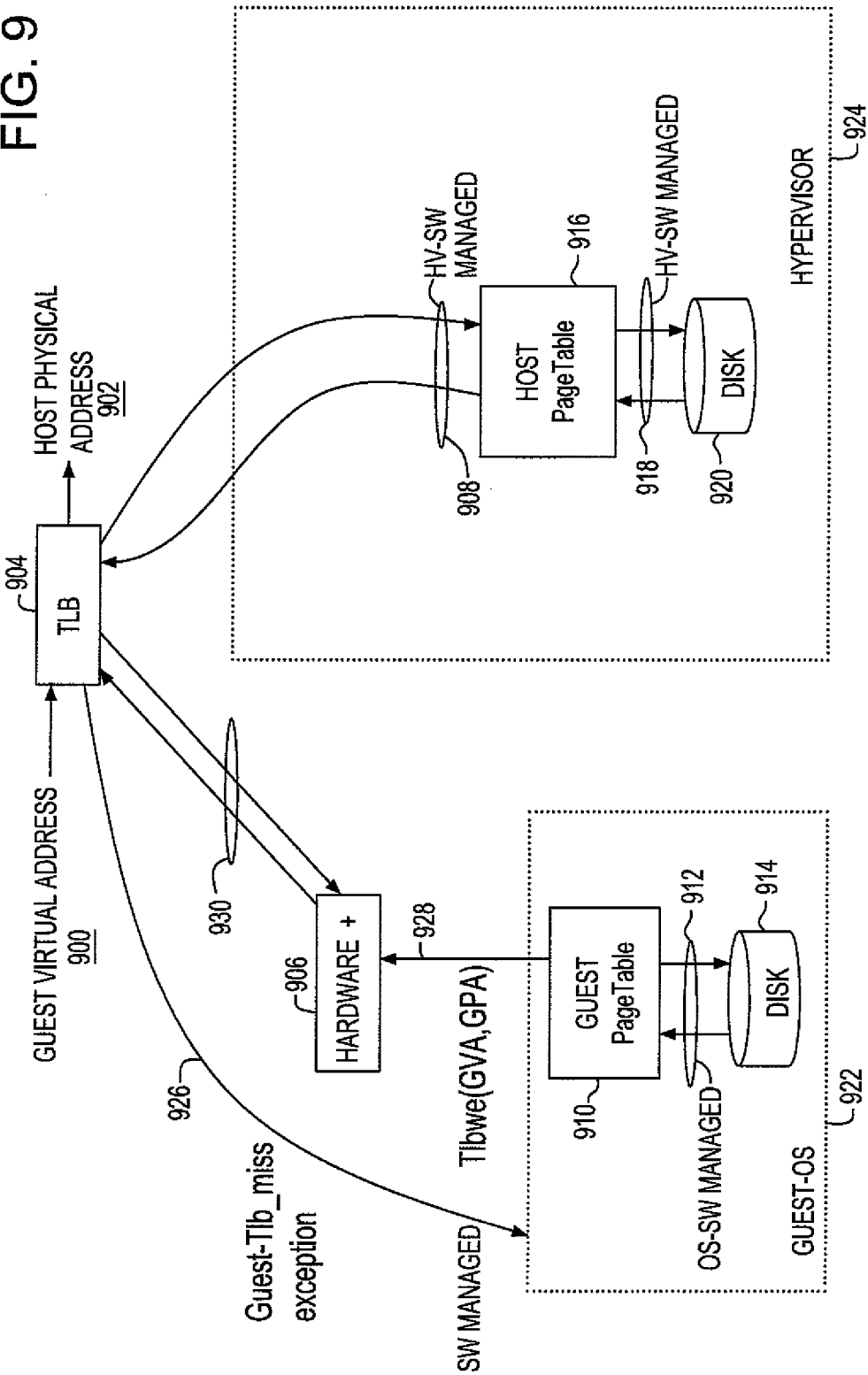
FIG. 9 illustrates that a TLB integrates at least one entry in a guest page table and at least one entry in a host page table.

FIG. 9 illustrates that one embodiment of the present invention integrates at least one entry in a guest page table and at least one entry in a host page table into a TLB. An application provides a GVA 900 to a TLB 904. If an entry corresponding to the GVA 900 is found in the TLB 904, a HPA 902 in the entry is provided to the application. If the entry is not found in the TLB 904, the TLB 904 issues a guest TLB miss exception 926. In response of the guest TLB miss exception 926, software (e.g., a guest OS 922) is invoked to look up a guest page table 910 to find an entry matching with the GVA 900 in the guest page table 910. Upon finding the matching entry in the guest page table 910, the software issues a TLBWE instruction 928 to hardware logic 906 (e.g., a CPU or microcontroller). TLBWE instruction 928 may include a mapping from the GVA 900 to a GPA. The TLBWE instruction 928 does not cause a privileged trap or paravirtualization. Therefore, the TLBWE instruction 928 is run by the hardware logic 906 at a supervisor mode without invoking a hypervisor 924. While running the TLBWE instruction 928, the hardware logic 906 looks up the TLB 904 to find an entry matching with the GPA. The entry matching with the GPA may include a mapping from the GPA to a HPA 902. If the entry matching with the GPA is found in the TLB 904, the hardware logic 906 combines the TLBWE instruction 928 and the entry matching with the GPA to form a mapping from the GVA 900 to the HPA 902. Then, the hardware logic 906 inserts the mapping from the GVA 900 to the HPA 902 as a new entry in the TLB 904 without invoking the hypervisor 924. Data exchange (e.g., sending the GPA from the hardware logic 906 to the TLB 904) between the hardware logic 906 and the TLB 904 may be managed by the hardware logic 906 via a communication bus 930.

If the entry matching with the GPA is not found in the TLB 904, the TLB 904 invokes the hypervisor 924 to look up an entry matching with the GPA in the host page table 916. If the entry matching with the GPA is found in the host page table 916, the hypervisor 924 issues a TLBWE instruction to the TLB 904 to install an entry including a mapping from the GPA to the HPA 902. The TLBWE instruction issued from the hypervisor 924 to the TLB 904 may include the mapping from the GPA to the HPA 902. Data exchange (e.g., sending the GPA from the TLB 904 to the host page table 916) the between the TLB 904 and the host page table 916 may be managed by the hypervisor 924 via a communication bus 908.

If the software (e.g., the guest OS 922) cannot find an entry matching with the GVA 900 in the guest page table 910, the software issues a page fault and retrieves a page corresponding to the GVA 900 from a disk 914. Then, the software writes a new entry including a mapping from the GVA 900 to a GPA in the guest page table 910. At the same time, the guest OS 922 issues a TLBWE instruction to the hardware logic 906 to write an entry including the mapping from the GVA 900 to the GPA in the TLB 904. Then, as described before, the hardware logic 906 handles the TLBWE instruction issued from the software without invoking the hypervisor 924. If the software cannot find a page matching with the GVA 900 in the disk 914, the software issues an error indicating that the application provided an invalid GVA 900. Data exchange between the guest page table 910 and the disk 914 may be managed by the software via a communication bus 912.

If the hypervisor 924 cannot find an entry matching with the GPA in the host page table 916, then the hypervisor 924 issues a page fault and then retrieves a page matching with the GPA from a disk 920. Subsequently, the hypervisor 924 writes an entry matching with the retrieved page (i.e., an entry including a mapping from the GPA to the HPA 902) in the host page table 916 and issues a TLBWE instruction to install an entry matching with the retrieved page in the TLB 904. If the hypervisor 924 cannot find a page matching with the GPA in the disk 920, the hypervisor 924 issues an error indicating the TLB 904 provided an invalid GPA. Data exchange between the host page table 916 and the disk 920 may be managed by the hypervisor 924 via a communication bus 918.

In this embodiment, the TLB 904 may include at least one entry in a guest page table 910 managed by the guest OS 922, at least one entry in a host page table 916 managed by the hypervisor 924 and at least one entry indicating a mapping from a GVA to a HPA. The entry in the guest page table may include a guest address translation. The entry in the host page table may include a host address translation. The mapping from the GVA to the HPA may be obtained by combining the guest address translation and the host address translation. Therefore, an entry in the TLB 904 may include one of: a guest address translation being represented by a <a GVA, a GPA> tuple that indicates the GVA corresponds to the GPA or that indicates the GVA is mapped to the GPA, a host address translation being represented by a <a GPA, a HPA> tuple that indicates the GPA corresponds to the HPA or that indicates the GPA is mapped to the HPA, and a combination of the guest address translation and the host address translation being represented by a <a GVA, a HPA> tuple indicates the GVA corresponds to the HPA or that indicates the GVA is mapped to the HPA. Thus, if an entry is changed (e.g., invalidated due to switching a guest OS) in the guest page table 910, then a corresponding entry(s) in the TLB 904 is also changed (e.g., invalidated). If an entry is changed (e.g., removed) in the host page table 916, then a corresponding entry(s) in the TLB 904 is also changed (e.g., removed).

In an alternative embodiment, while executing the TLBWE instruction 928, the hardware logic 906 computes the HPA 902 corresponding to the GPA provided from the TLBWE instruction 928. The hardware logic 906 may compute the HPA 902 by executing a computation including input parameters (e.g., the LPID, the GPA). For example, the computation can be (a partition size of the guest OS 922×(the LPID-1))+ GPA, where the LPID is larger than or equal to 1 and the partition size refers to a physical memory space belonging to the guest OS 922. However, the computation can be any formula receiving the input parameters and generating the HPA. The hardware logic 906 then combines the TLBWE instruction 928 and the compute HPA to construct a mapping from the GVA 900 to the HPA 902. After constructing the mapping, the hardware logic 906 inserts the mapping to TLB 904 as a new entry, e.g., by issuing a TLBWE instruction including <the GVA, the HVA> tuple. In this embodiment, the hardware logic 906 computes the HPA 902 without looking up the TLB 904, the guest page table 910 and the host page table 916.

In a further embodiment, the disk 914 and the disk 920 may be a same disk (e.g., a magnetic disk, an optical disk and a hard disk).

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) run by a processor (e.g., Intel® Core™ 2, IBM® PowerPC®) for causing a computer to perform method steps of this invention.

The present invention may include a method of deploying a computer program product including a program of instructions in a computer readable medium for one or more functions of this invention, wherein, when the program of instructions is run by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for allowing a guest operating system (guest OS) to modify an entry in a main TLB (Translation Lookahead Buffer), said method comprising:
   providing, by an application, a guest virtual address (GVA) to said main TLB;
   upon finding an entry in said main TLB matching with said GVA, providing a corresponding host physical address (HPA) to said application;
   upon finding no matching entry in said main TLB, issuing a guest TLB miss exception to said guest OS;
   looking up, by said guest OS, a guest page table in order to find said matching entry in said guest page table; and
   upon finding said matching entry in said guest page table, issuing, by said guest OS, an instruction to modify an entry in said main TLB in order for said modified entry to include a mapping of a <said GVA, a guest physical address (GPA)>tuple, said <said GVA, said GPA>tuple indicating that said GVA corresponds to said GPA;
   upon receiving said issued instruction, looking for a first entry, in a host TLB, matching with said GPA, said first entry including a mapping of a <said GPA, said HPA>tuple, said <said GPA, said HPA>tuple indicating that said GPA corresponds to said HPA;
   upon finding no entry matching with said GPA in said host TLB, looking up a host page table to find said entry matching with said GPA;
   upon finding said entry matching with said GPA in said host page table, providing said entry matching with said GPA to said host TLB; and
   creating said entry matching with said GPA in said host TLB.

2. The method according to claim 1, further comprising:
   upon finding said entry matching with said GPA in said host TLB or said host page table, combining, by a hardware logic device, said <said GVA, said GPA>included in said instruction and said <said GPA, said HPA>included in said host TLB or said host page table; and
   creating, based on said combining, a new entry in said main TLB, said new entry including a mapping of a <said GVA, said HPA>tuple, said <said GVA, said HPA>indicating that said GVA corresponds to said HPA.

3. The method according to claim 2, further comprising:
upon creating said new entry in said main TLB, enabling said guest OS to reissue said instruction.

4. The method according to claim 2, further comprising:
updating, by said hardware logic device, said issued instruction in order to create an entry in said main TLB with said mapping of said <said GVA, said HPA>.

5. The method according to claim 1, further comprising:
upon receiving said guest TLB miss exception, if said guest OS cannot find said entry matching with said GVA in said guest page table, issuing a page fault and retrieving a page corresponding to said GVA from a storage device;
creating a new entry matching with said GVA in said guest page table; and
issuing said instruction to create said new entry matching with said GVA in said main TLB.

6. The method according to claim 1, wherein said host TLB is managed by a hardware logic device without said involvement of a hypervisor.

7. The method according to claim 6, further comprising:
if a new entry needs to be written in said host TLB, providing, by said hypervisor, said new entry to said hardware logic device; and
issuing, by said hardware logic device, said instruction to said host TLB.

8. A system for allowing a guest operating system (guest OS) to modify an entry in a main TLB (Translation Lookahead Buffer), said system comprising:
a memory device;
a processor coupled to said memory device;
an application, run by said processor, providing a guest virtual address (GVA) to said main TLB;
said processor coupled to said main TLB, upon finding an entry in said main TLB matching with said GVA, providing a corresponding host physical address (HPA) to said application;
said processor coupled to said main TLB, upon finding no matching entry in said main TLB, issuing a guest TLB miss exception to said guest OS;
said guest OS looking up a guest page table in order to find said matching entry in said guest page table;
said guest OS, upon finding said matching entry in said guest page table, issuing an instruction to modify an entry in said main TLB in order for said modified entry to include a mapping of a <said GVA, a guest physical address (GPA)>tuple, said <said GVA, said GPA>tuple indicating that said GVA corresponds to said GPA, wherein upon receiving said issued instruction, said processor looks for a first entry, in a host TLB, matching with said GPA, said first entry including a mapping of a <said GPA, a host physical address (HPA)>tuple, said <said GPA, said HPA>tuple indicating that said GPA corresponds to said HPA;
said processor, upon finding no entry matching with said GPA in said host TLB, looking up a host page table to find said entry matching with said GPA;
said processor, upon finding said entry matching with said GPA in said host page table, providing said entry matching with said GPA to said host TLB; and
said processor creating said entry matching with said GPA in said host TLB.

9. The system according to claim 8, wherein upon finding said entry matching with said GPA in said host TLB or said host page table, said processor combines said <said GVA, said GPA>included in said instruction and said <said GPA, said HPA>included in said host TLB or said host page table; and
said processor creating, based on said combining, a new entry in said main TLB, said new entry including a mapping of a <said GVA, said HPA>tuple, said <said GVA, said HPA>indicating that said GVA corresponds to said HPA.

10. The system according to claim 9, wherein upon said processor creating said new entry in said main TLB, a hypervisor enables said guest OS to reissue said instruction.

11. The system according to claim 9, wherein said processor updates said issued instruction in order to create an entry in said main TLB with said mapping of said <said GVA, said HPA>.

12. The system according to claim 8, wherein upon said guest OS receiving said guest TLB miss exception, if said guest OS cannot find said entry matching with said GVA in said guest page table, a hypervisor issues a page fault and retrieving a page corresponding to said GVA from a storage device;
said guest OS creating a new entry matching with said GVA in said guest page table; and said guest OS issuing said instruction to create said new entry matching with said GVA in said main TLB.

13. The system according to claim 8, wherein said host TLB is managed by said processor without said involvement of a hypervisor.

14. The system according to claim 13, wherein if a new entry needs to be written in said host TLB, said hypervisor provides said new entry to said processor; and
said processor issuing said instruction to said host TLB.

15. A computer program product for allowing a guest operating system (guest OS) to modify an entry in a main TLB (Translation Lookahead Buffer), the computer program product comprising a non-transitory storage medium readable by a processing circuit and storing instructions run by the processing circuit for performing a method, said method steps comprising:
providing, by an application, a guest virtual address (GVA) to said main TLB;
upon finding an entry in said main TLB matching with said GVA, providing a corresponding host physical address (HPA) to said application;
upon finding no matching entry in said main TLB, issuing a guest TLB miss exception to said guest OS;
looking up, by said guest OS, a guest page table in order to find said matching entry in said guest page table; and
upon finding said matching entry in said guest page table, issuing, by said guest OS, an instruction to modify an entry in said main TLB in order for said modified entry to include a mapping of a <said GVA, a guest physical address (GPA)>tuple, said <said GVA, said GPA>tuple indicating that said GVA corresponds to said GPA;
upon receiving said issued instruction, looking for a first entry, in a host TLB, matching with said GPA, said first entry including a mapping of a <said GPA, said (HPA)>tuple, said <said GPA, said HPA>tuple indicating that said GPA corresponds to said HPA;
upon finding no entry matching with said GPA in said host TLB, looking up a host page table to find said entry matching with said GPA;
upon finding said entry matching with said GPA in said host page table, providing said entry matching with said GPA to said host TLB; and
creating said entry matching with said GPA in said host TLB.

16. The computer program product according to claim 15, wherein said method further comprises:

upon finding said entry matching with said GPA in said host TLB or said host page table, combining, by a hardware logic device, said <said GVA, said GPA> included in said instruction and said <said GPA, said HPA> included in said host TLB or said host page table; and creating, based on said combining, a new entry in said main TLB, said new entry including a mapping of a <said GVA, said HPA> tuple, said <said GVA, said HPA> indicating that said GVA corresponds to said HPA.

17. The computer program product according to claim 16, wherein said method further comprises:

upon creating said new entry in said main TLB, enabling said guest OS to reissue said instruction.

18. The computer program product according to claim 16, wherein said host TLB is managed by said hardware logic device without said involvement of a hypervisor.

19. The computer program product according to claim 18, wherein said method further comprises:

if a new entry needs to be written in said host TLB, providing, by said hypervisor, said new entry to said hardware logic device; and issuing, by said hardware logic device, said instruction to said host TLB.

20. The computer program product according to claim 16, wherein said method further comprises:

updating, by said hardware logic device, said issued instruction in order to create an entry in said main TLB with said mapping of said <said GVA, said HPA>.

21. The computer program product according to claim 15, wherein said method further comprises:

upon receiving said guest TLB miss exception, if said guest OS cannot find said entry matching with said GVA in said guest page table, issuing a page fault and retrieving a page corresponding to said GVA from a storage device;

creating a new entry matching with said GVA in said guest page table; and issuing said instruction to create said new entry matching with said GVA in said main TLB.

22. A method for allowing a guest operating system (guest OS) to modify an entry in a main TLB (Translation Lookahead Buffer), said method comprising:

providing, by an application, a guest virtual address (GVA) to said main TLB;

upon finding an entry in said main TLB matching with said GVA, providing a corresponding host physical address (HPA) to said application;

upon finding no matching entry in said main TLB, issuing a guest TLB miss exception to said guest OS;

looking up, by said guest OS, a guest page table in order to find said matching entry in said guest page table; and upon finding said matching entry in said guest page table, issuing, by said guest OS, an instruction to modify an entry in said main TLB in order for said modified entry to include a mapping of a <said GVA, a guest physical address (GPA)> tuple, said <said GVA, said GPA> tuple indicating that said GVA corresponds to said GPA, wherein the providing the GVA, the providing the corresponding HPA, the issuing the guest TLB miss exception, the looking up the guest page table, and the issuing the instruction obviates an intervention of a hypervisor.

23. The method according to claim 22, further comprising:

upon receiving said guest TLB miss exception, if said guest OS cannot find said entry matching with said GVA in said guest page table, issuing a page fault and retrieving a page corresponding to said GVA from a storage device;

creating a new entry matching with said GVA in said guest page table; and issuing said instruction to create said new entry matching with said GVA in said main TLB.

* * * * *